(12) United States Patent
Chang

(10) Patent No.: US 10,500,699 B2
(45) Date of Patent: Dec. 10, 2019

(54) HANDS-FREE DUAL CLAMP DEVICE

(71) Applicant: Michael Chau-Lun Chang, Taipei (TW)

(72) Inventor: Michael Chau-Lun Chang, Taipei (TW)

( * ) Notice: Subject to any disclaimer, the term of this patent is extended or adjusted under 35 U.S.C. 154(b) by 223 days.

(21) Appl. No.: 15/828,363

(22) Filed: Nov. 30, 2017

(65) Prior Publication Data

US 2019/0160632 A1    May 30, 2019

(51) Int. Cl.
| | |
|---|---|
| B25B 3/00 | (2006.01) |
| B25B 5/00 | (2006.01) |
| B25B 5/10 | (2006.01) |
| B25B 5/06 | (2006.01) |
| B25B 5/16 | (2006.01) |
| F16B 2/12 | (2006.01) |

(52) U.S. Cl.
CPC ............. B25B 5/003 (2013.01); B25B 5/062 (2013.01); B25B 5/102 (2013.01); B25B 5/163 (2013.01); F16B 2/12 (2013.01)

(58) Field of Classification Search
CPC .... B25B 1/00; B25B 1/04; B25B 1/10; B25B 3/00; B25B 5/00
See application file for complete search history.

(56) References Cited

U.S. PATENT DOCUMENTS

| | | | | |
|---|---|---|---|---|
| 4,936,053 A * | 6/1990 | Shanelec | ................. | B24B 3/365 269/45 |
| 4,943,039 A * | 7/1990 | Jackson | ................. | B25B 5/006 269/45 |
| 6,427,993 B1 * | 8/2002 | Prochac | ............. | B23K 37/0533 269/37 |
| 6,520,495 B1 * | 2/2003 | La Mendola | ........... | B25B 5/006 24/300 |
| 7,618,029 B2 * | 11/2009 | Haley | .................... | B23K 3/087 269/8 |
| 7,766,313 B2 * | 8/2010 | Panosian | ................. | B25B 5/003 269/3 |
| 2019/0160632 A1 * | 5/2019 | Chang | ..................... | B25B 5/003 |

* cited by examiner

*Primary Examiner* — Lee D Wilson

(57) ABSTRACT

A hands-free dual clamp device includes two clamping units, each having an upper clamping body, a lower clamping body, a mating portion, and a shaft module. The shaft module is spirally inserted through the upper and lower clamping bodies and is rotatable, so as to enable the upper and lower clamping bodies to be adjustable at angles with respect to each other and cooperatively form a clamping space for clamping an external object. A connecting module includes at least a connecting unit having two opposite end portions, which are respectively provided with a first connecting element and a second connecting element. The first connecting element connected to the mating portion of one of the clamping units, and the second connecting element connected to the mating portions of the other of the clamping units, so that the two clamping units are linked together with the connecting module.

9 Claims, 14 Drawing Sheets

HANDS-FREE DUAL CLAMP DEVICE

RELATED APPLICATIONS

Background of the Invention

1. Field of the Invention

The present invention relates to a clamp device and particularly to a hands-free dual clamp device, which is readily connectable and is angle-adjustable for securely clamping two objects.

2. Related Art

With the rapid development and widely application of wireless communication, people are deeply engaged with mobile devices at anytime or any places. Such mobile devices, for example, can be smart phones, tablets, or digital cameras. Unfortunately, in some circumstances, users are hard to hold their mobile devices. Therefore, an external auxiliary fixing tool is used to help users support the mobile devices.

Conventional fixing apparatus for holding or fixing mobile devices are designed to be conveniently carried and generally has two opposite ends, wherein one end is to be held by users, and the other end is utilized to hold a mobile device, such as a smart phone. Usually, users can use such auxiliary fixing apparatus for taking a selfie. Namely, one hand is to hold an extendable rod of the fixing apparatus so that the mobile device held by the fixing apparatus is capable of facing users for the purpose of taking a photo. However, such kind of fixing apparatus is needed to be held by users, which results in a limited distance for taking a picture. Consequently, conventional fixing apparatus are being improved to be capable of being positioned without hands to hold. Specifically, the improved fixing apparatus has two ends to hold objects, wherein one end is equipped with a holding frame to hold a mobile device, and the other end is to be fixed to an external object for positioning the fixing apparatus so that users do not need to personally hold the fixing apparatus. Though such an improved fixing apparatus seemed to solve the problem of hand-held inconvenience, there is only one end of the conventional fixing apparatus can be used to hold mobile device, while the other end is configured to be fixed onto an object. Moreover, those functional ends are not replaceable with each other, whereby limiting the range of objects to be held or fixed.

SUMMARY OF THE INVENTION

Accordingly, an object of the present invention is to provide a hands-free dual clamp device being capable of readily securely two objects so as to allow users to be free of holding the device and the objects.

Another object of the present invention is to provide a hands-free dual clamp device being capable of clamping objects of various profiles, and are readily assembled or detachable for being carried or replaced with different types or functions of components.

To achieve the above-mentioned objects, the hands-free dual clamp device comprises two clamping units, each of the clamping units comprising an upper clamping body, a lower clamping body, a mating portion disposed on one end of the upper clamping body, and a shaft module, one end of the lower clamping body pivotally connected to the one end of the upper clamping body. The shaft module is spirally inserted through the upper and lower clamping bodies and is rotatable, so as to enable the upper and lower clamping bodies to be adjustable at angles with respect to each other and cooperatively form a clamping space for clamping an external object. A connecting module comprises at least a connecting unit having two opposite end portions, one of the end portions provided with a first connecting element, the other end portion provided with a second connecting element, the first connecting element connected to the mating portion of one of the clamping units, and the second connecting element connected to the mating portions of the other one of the clamping units, so that the two clamping units are linked together with the connecting module.

In one aspect of the present invention, the upper clamping body and the lower clamping body respectively define a root portion located adjacent to the mating portion, the shaft module comprises an outer shaft, an inner shaft, and two sleeve pieces respectively disposed in the root portions of the upper and lower clamping bodies, the outer and inner shafts respectively form threads, the outer shaft is spirally connected with the sleeve piece of the upper clamping body, and a part of the inner shaft is spirally engaged into the outer shaft, and another part of the inner shaft is spirally connected with the sleeve piece of the lower clamping body.

In another aspect of the present invention, the threads of the outer shaft spiral in a direction opposite to that of the inner shaft, and the inner shaft is coaxially rotatable in the sleeve piece of the lower clamping body in conjunction with rotation of the outer shaft.

In another aspect of the present invention, the sleeve pieces of the upper and lower clamping bodies are rotatable in the root portions, so that the outer shaft and the inner shaft are capable of swinging with respect to the sleeve pieces when the outer shaft rotates, whereby adjusting a size of the clamping space between the upper and lower clamping bodies.

The hands-free dual clamp device of the present invention utilizes the connecting module to detachably connect two clamping units and for clamping external objects and (e.g. smart phones, microphones, hangers or boards), where the clamping units are capable of rotating at various angles so as to enable users to use mobile electronic devices to watch videos without holding by hands, whereby effectively overcoming the drawbacks of conventional fixing devices which are needed to be hand-held. Furthermore, the claw-type clamping units are capable of being adjusted by the shaft module to readily adjust the size of the clamping space for various shapes of objects and to apply secure clamping force, whereby successfully overcoming the drawbacks of conventional fixing devices that utilize springs to provide clamping force which renders the clamping force insufficient, and are incapable of clamping round or irregular shapes of objects.

DESCRIPTION OF THE PREFERRED EMBODIMENTS

Figure 1:
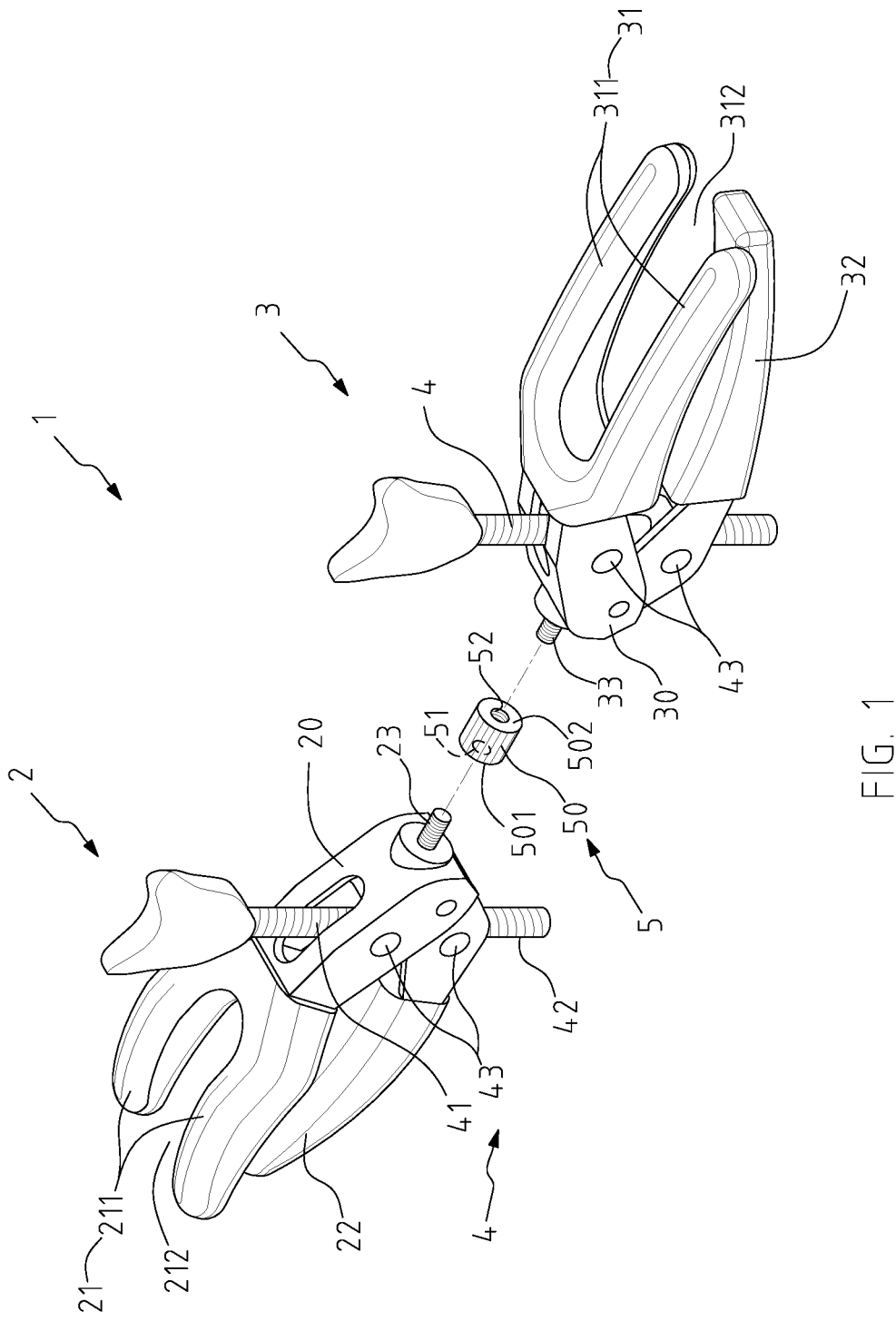
FIG. 1 is a perspective exploded view of a hands-free dual clamp device in accordance with a first embodiment of the present invention.
Figure 2:
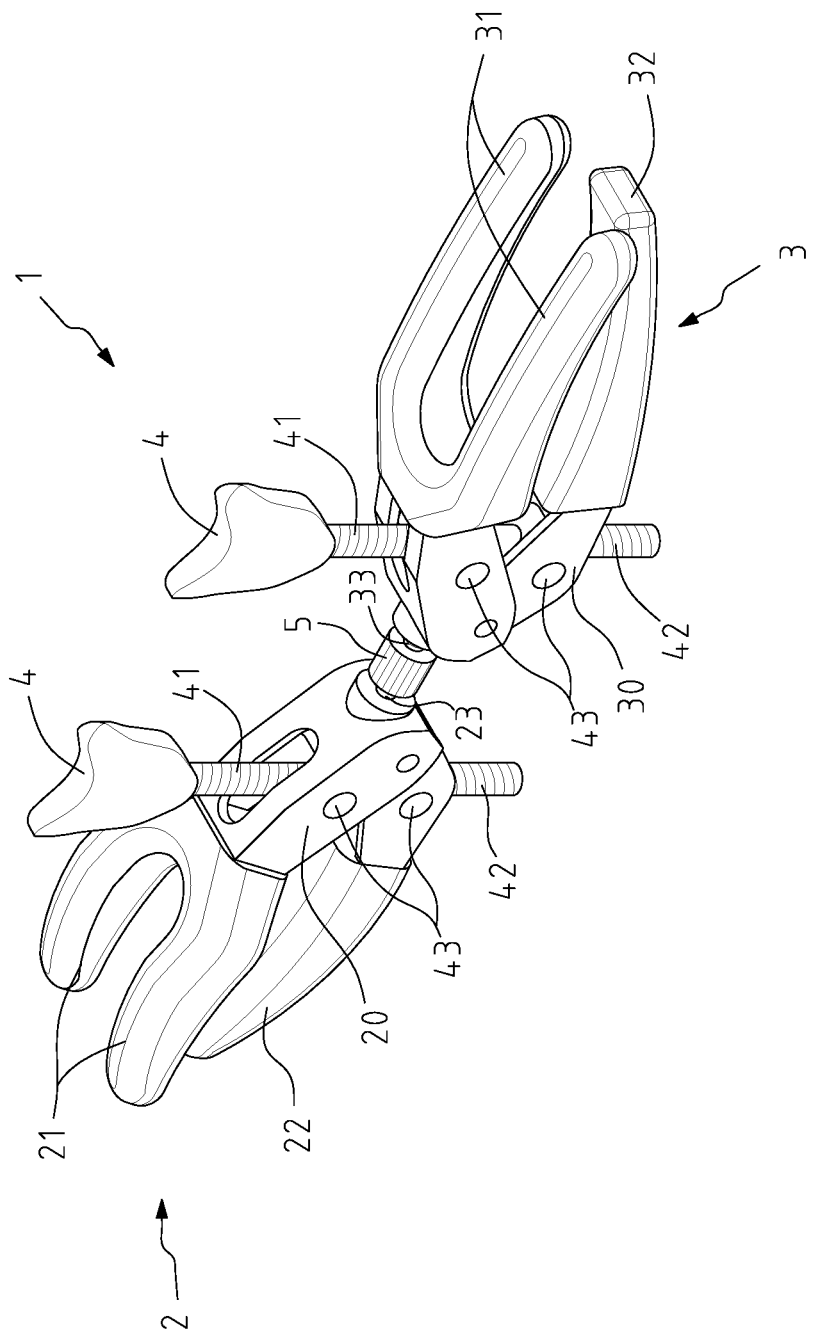
FIG. 2 is a perspective assembly view of FIG. 1.

Referring to FIGS. 1 to 5 showing a first embodiment of a hands-free dual clamp device of the present invention, the hands-free dual clamp device 1 comprises two clamping units 2 and 3, and a connecting module 5. Each of the clamping units 2 and 3 comprises an upper clamping body 21 and 31, a lower clamping body 22 and 32, a mating portion 23 and 33 disposed on one end of the upper clamping body 21 and 31, and a shaft module 4. One end of the lower clamping body 22 and 32 is pivotally connected to the one end of the upper clamping body 21 and 31. In this embodiment, the upper clamping body 21 and 31 and the lower clamping bodies 22 and 32 respectively defines a root portion 20 and 30 thereon located adjacent to the mating portion 23 and 33. The upper and lower clamping bodies 21, 31, 22 and 32 respective have a curved configuration in aside sectional view so as to facilitate the clamping of objects having polygon or curved profiles. Furthermore, the upper and lower clamping bodies 21, 31, 22 and 32 are respectively covered with a soft or rubber material in order to enhance the clamping strength.

Figure 3:
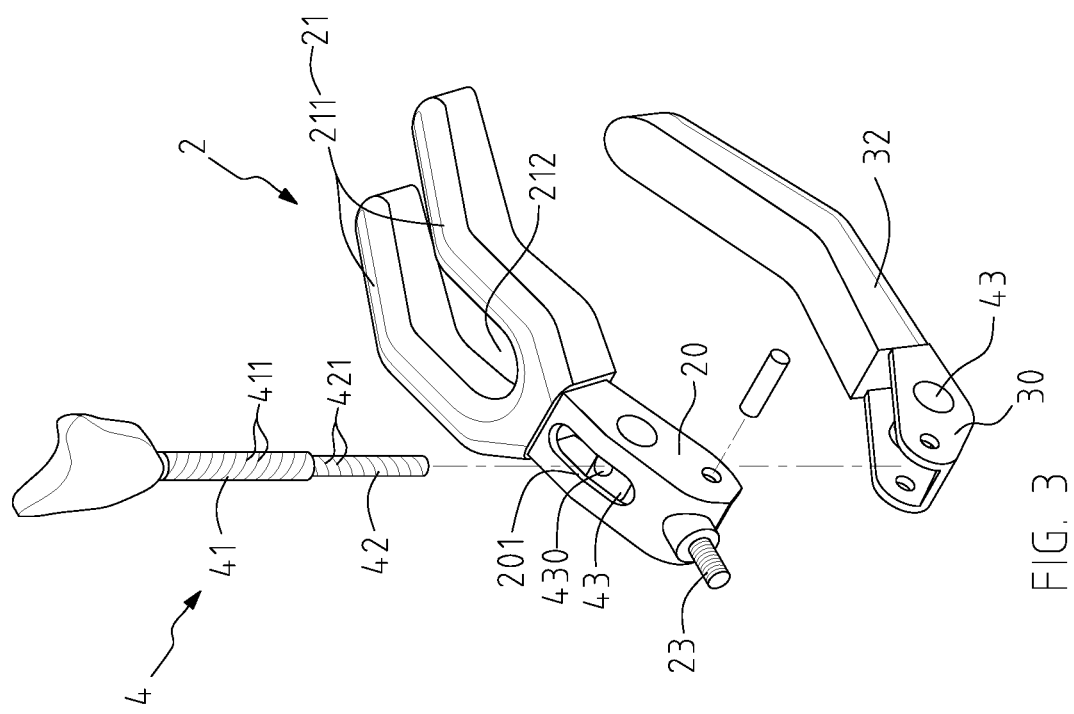
FIG. 3 is a perspective exploded view of a clamping unit of the present invention.
Figure 5:
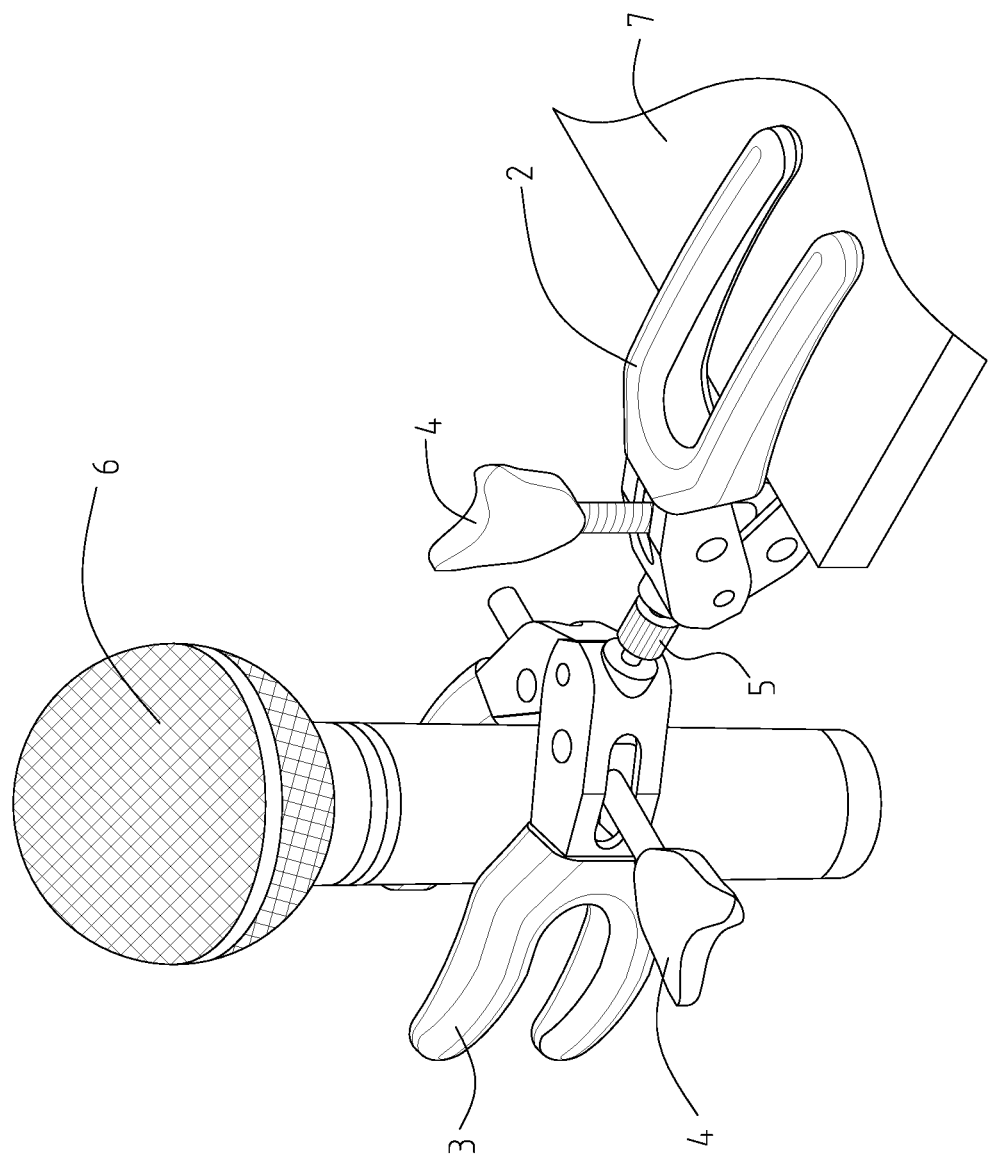
FIG. 5 is a schematic perspective view showing the hands-free dual clamp device in a state of use.
Figure 13:
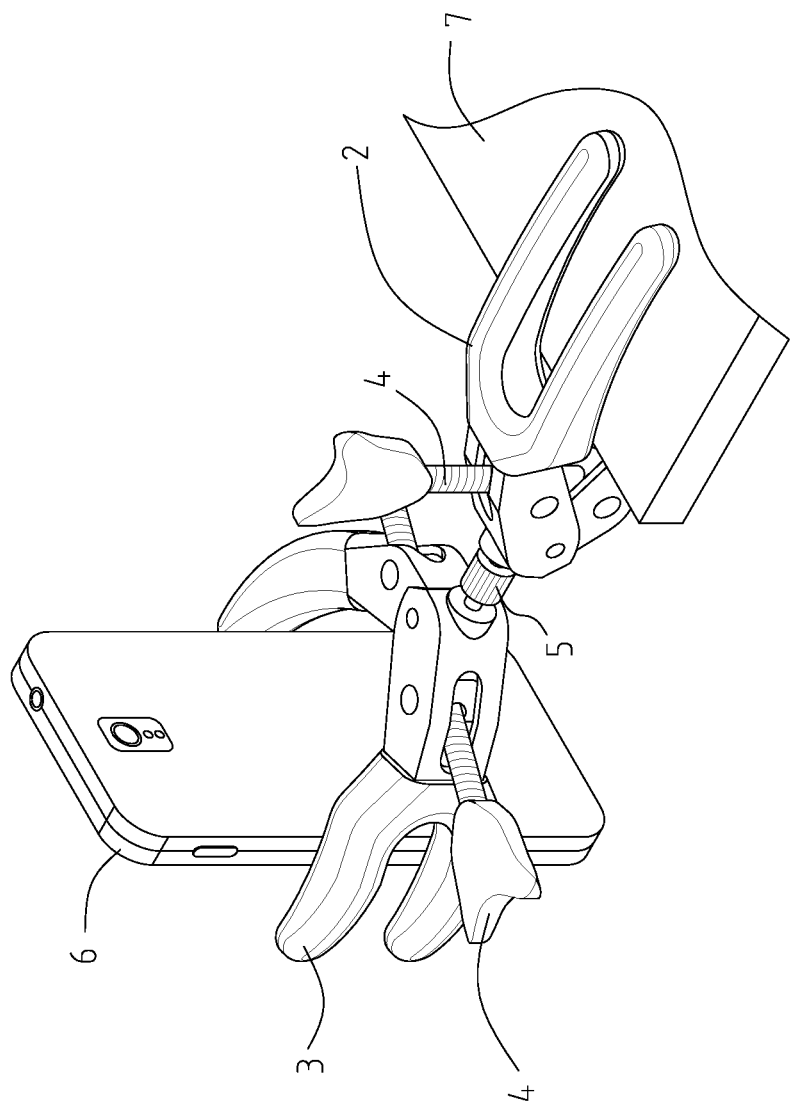
FIG. 13 is a schematic perspective view showing the hands-free dual clamp device in another state of use.

Referring to FIG. 3, the shaft module 4 is spirally inserted through the upper and lower clamping bodies 21, 31, 22 and 32 and is rotatable, so as to enable the upper and lower clamping bodies 21, 31, 22 and 32 to be adjustable at angles with respect to each other and to cooperatively form a clamping space for clamping external objects 6 and 7 (as shown in FIGS. 5 and 13). The shaft module 4 comprises an outer shaft 41, an inner shaft 42, and two sleeve pieces 43 respectively and transversally disposed in the root portions 20 and 30. Each of the sleeve pieces 43 has a though hole 430 at a middle thereof. The outer and inner shafts 41 and 42 respectively form threads 411 and 421. The outer shaft 41 is spirally connected with the through hole 430 of the sleeve piece 43 of the upper clamping body 21 and 31, and the outer shaft 41 is hollow therein and open at one end thereof. Apart of the inner shaft 42 is spirally engaged into the outer shaft 41, and another part of the inner shaft 42 is spirally connected with the through hole 430 of the sleeve piece 43 of the lower clamping body 22 and 32. A top of the outer shaft 41 is further provided with a tab (not labeled) for being manipulated to rotate the outer shaft. Particularly, the threads 411 of the outer shaft 41 spiral in a direction opposite to the threads 421 of the inner shaft 42.

As shown in FIGS. 1 and 3, each of the upper clamping bodies 21 and 31 of the two clamping units 2 and 3 comprises two claws 211 and 311 extending from the root portion 20 and 30. The two claws 211 and 311 are spaced apart to form an interval 212 and 312. The corresponding lower clamping body 22 and 32 has a claw-like shape substantially symmetrical to the claws 211 and 311, and is capable of being adjusted by the shaft module 4 to move into the interval 212 and 312 (as shown in FIG. 4).

Figure 10:
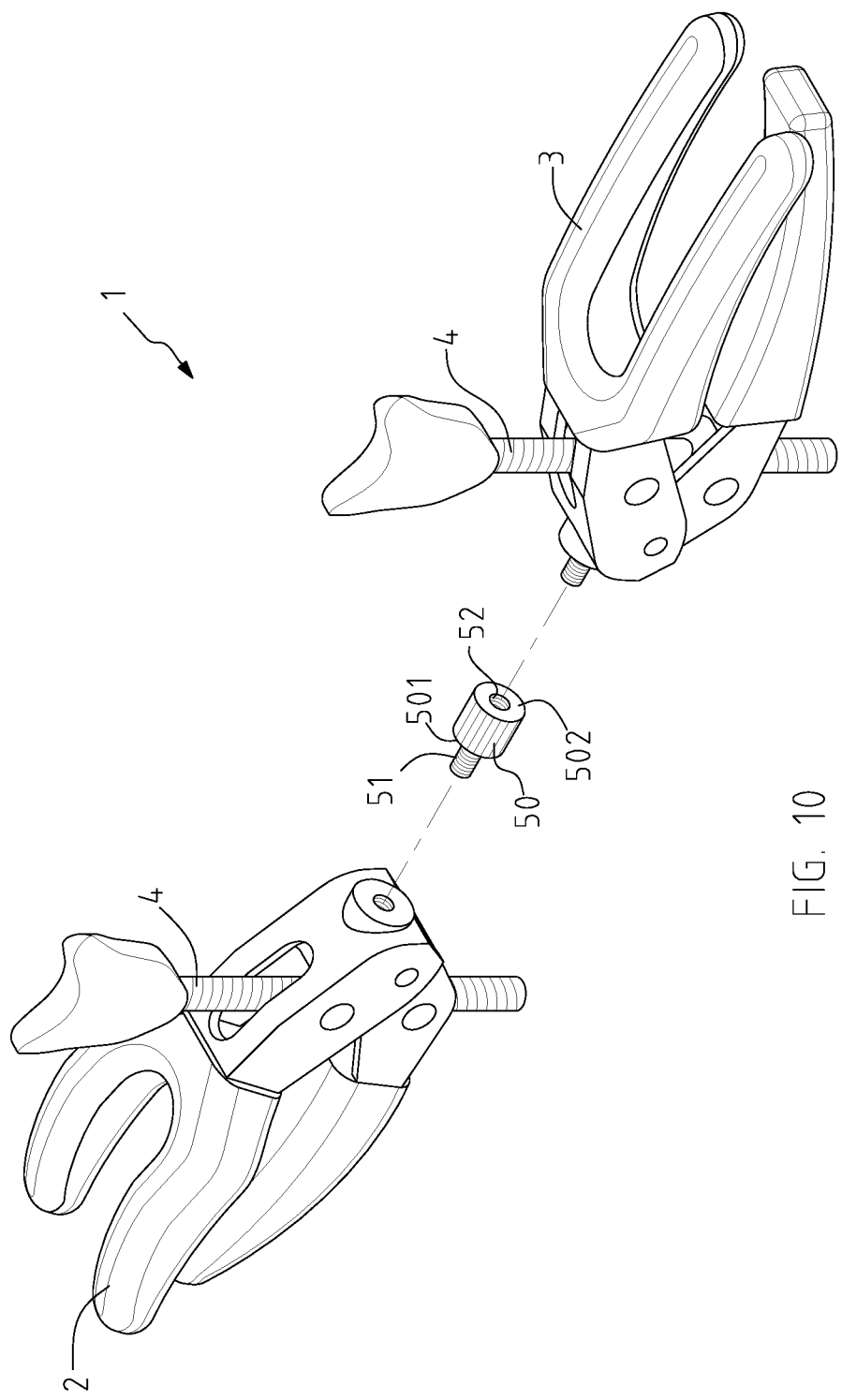
FIG. 10 is a schematic perspective view showing another embodiment of the connecting module of the present invention.

Continuing referring to FIG. 1, the connecting module 5 comprises a connecting unit 50 having two opposite end portions 501 and 502, one of the end portions 501 is provided with a first connecting element 51, and the other end portions 502 is provided with a second connecting element 52. In this embodiment, the first connecting element 51 is connected to the mating portion 23 of the clamping unit 2, and the second connecting element 52 is connected to the mating portion 33 of the opposite clamping unit 3, whereby the clamping units 2 and 3 are rotatable about the connecting unit 50. Specifically, the first connecting element 51 and the second connecting element 52 respectively protrude inward to form a hole-shaped configuration having threads therein, and the mating portions 23 and 33 protrude out of the upper clamping bodies 21 and 31 so as to be screwingly connected to the first and second connecting elements 51 and 52. In another embodiment, the first and second connecting elements 51 and 52 are exemplified by engaging grooves (not shown), and the mating portions 23 and 33 are exemplified by engaging portions (not shown) for engaging with the engaging grooves. Furthermore, as shown in FIG. 10, the first connecting element 51 and the second connecting element 52 both can be exemplified as a male connector or female connector or one male and one female connector, while the mating portion 23 and 33 are correspondingly configured to be connectable to the first and second connecting elements 51 and 52.

Figure 4:
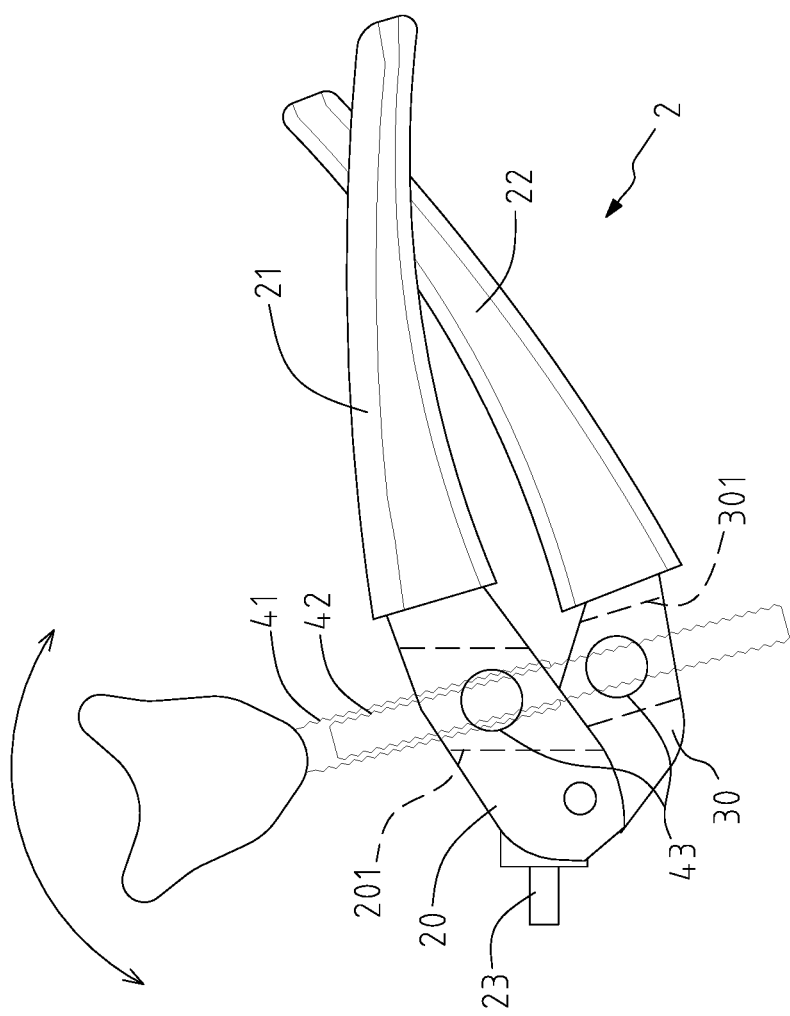
FIG. 4 is a schematic side sectional view of the clamping unit.

The hands-free dual clamp device 1 of the present invention in use, first, rotate the tab of the outer shaft 41, whereby the inner shaft 42 is coaxially rotatable in the sleeve piece 43 of the lower clamping body 22 and 32 in conjunction with rotation of the outer shaft 41, and because the threads 411 and 421 of the outer and inner shafts 41 and 42 spiral in opposite directions, the inner shaft 42 is capable of rapidly coaxially rotating by the rotation of the outer shaft 41, so as to simultaneously drive the lower clamping body 22 and 32 to pivotally rotate towards the claws 211 and 311 of the upper clamping body 21 and 31 (as shown in FIG. 4). In this manner, the size of the clamping space is being rapidly adjusted to fit the external object 6 or 7. Specifically, the sleeve pieces 43 of the upper and lower clamping bodies 21, 31, 22 and 32 are respectively rotatable in the root portions 20 and 30, so that the outer shaft 41 and the inner shaft 42 are capable of swinging with respect to the sleeve pieces 43 when the outer shaft 41 rotates. Particularly, each of the root portions 20 and 30 of the upper clamping body 21 and 31 and the lower clamping body 22 and 32 has a track slot 201 and 301 formed thereon and penetrating the root portion 20 and 30 (as shown in FIGS. 3 and 4). The track slot 201 and 301 are respectively configured to provide a space for the outer shaft 41 and the inner shaft 42 to swing therein. As shown in FIG. 5, the clamping unit 2 clamps the object 7, which is, for example, such as a flange of table or board; the other clamping unit 3 clamps the object 6, which is, for example, a microphone, or in another embodiment, as shown in FIG. 13, the clamping unit 3 clamps the object 6, which is a smart phone.

Figure 6:
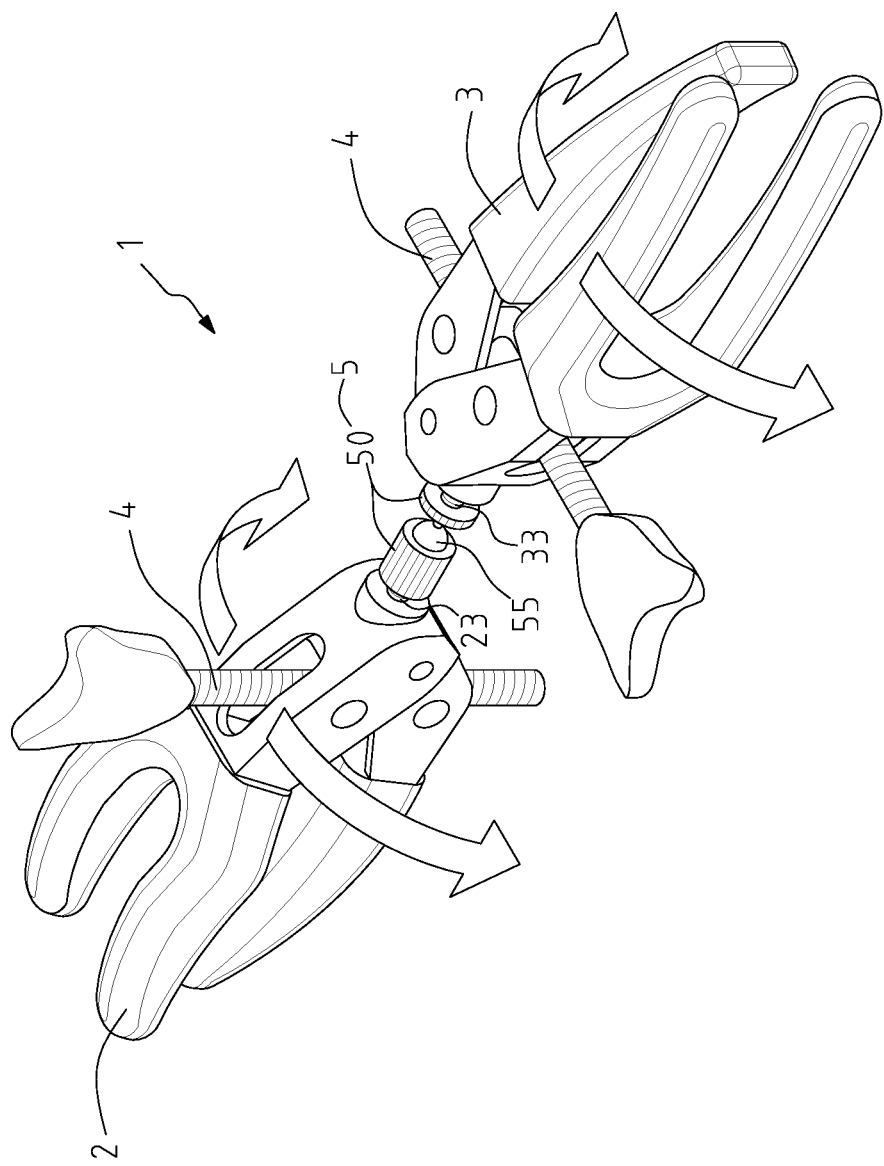
FIG. 6 is a schematic perspective view showing an embodiment of a connecting module of the present invention.

Referring to FIG. 6 showing another embodiment of the connecting module 5 of the present invention, in this embodiment, the connecting module 5 comprises two connecting units 50 and a universal joint 55. The opposite ends of the universal joint 55 respectively connect the two connecting units 50, so as to enable the connecting units 50 to rotate in multiple directions at 360 degrees.

Figure 7:
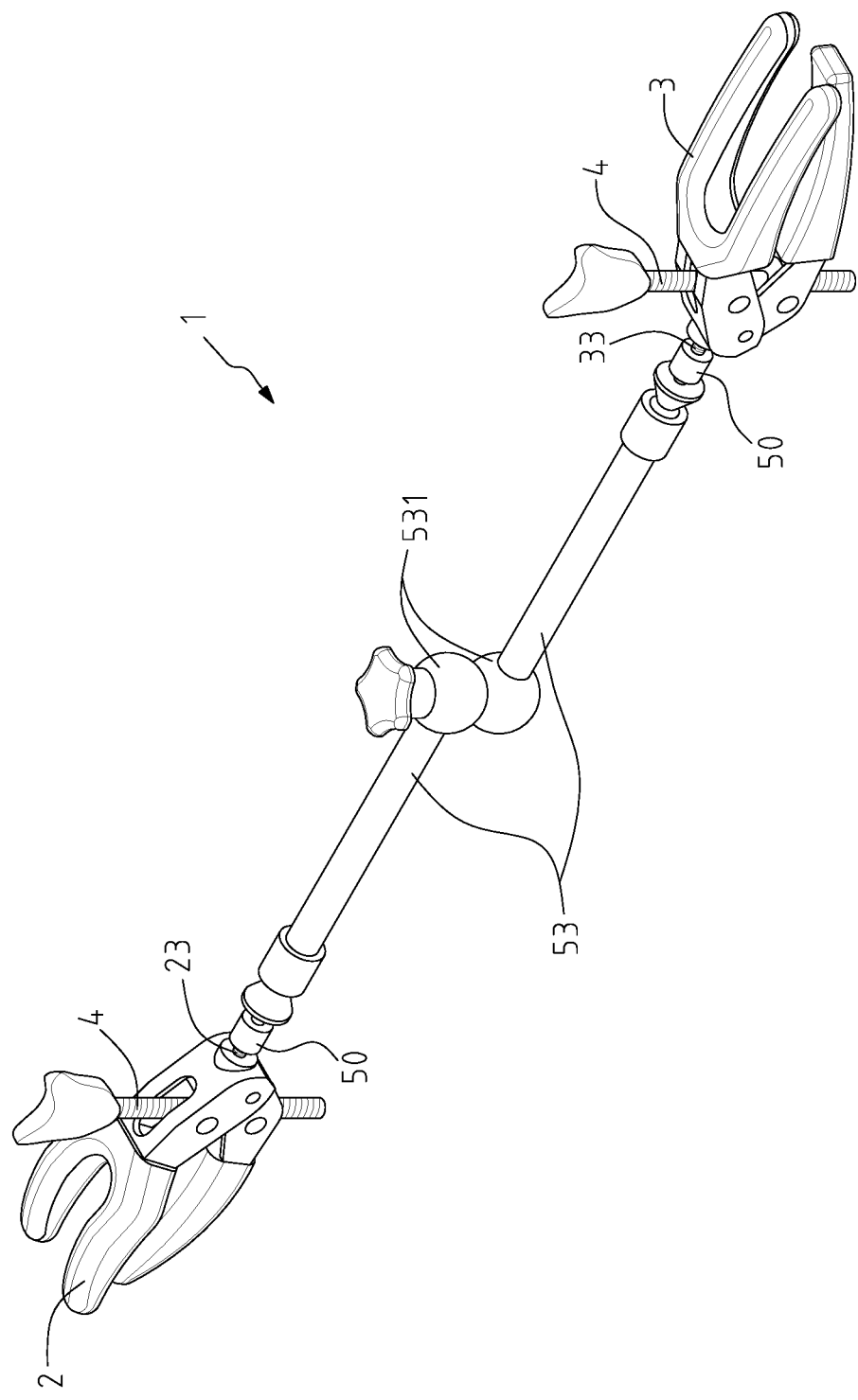
FIG. 7 is a perspective assembly view of a hands-free dual clamp device in accordance with a second embodiment of the present invention.
Figure 8:
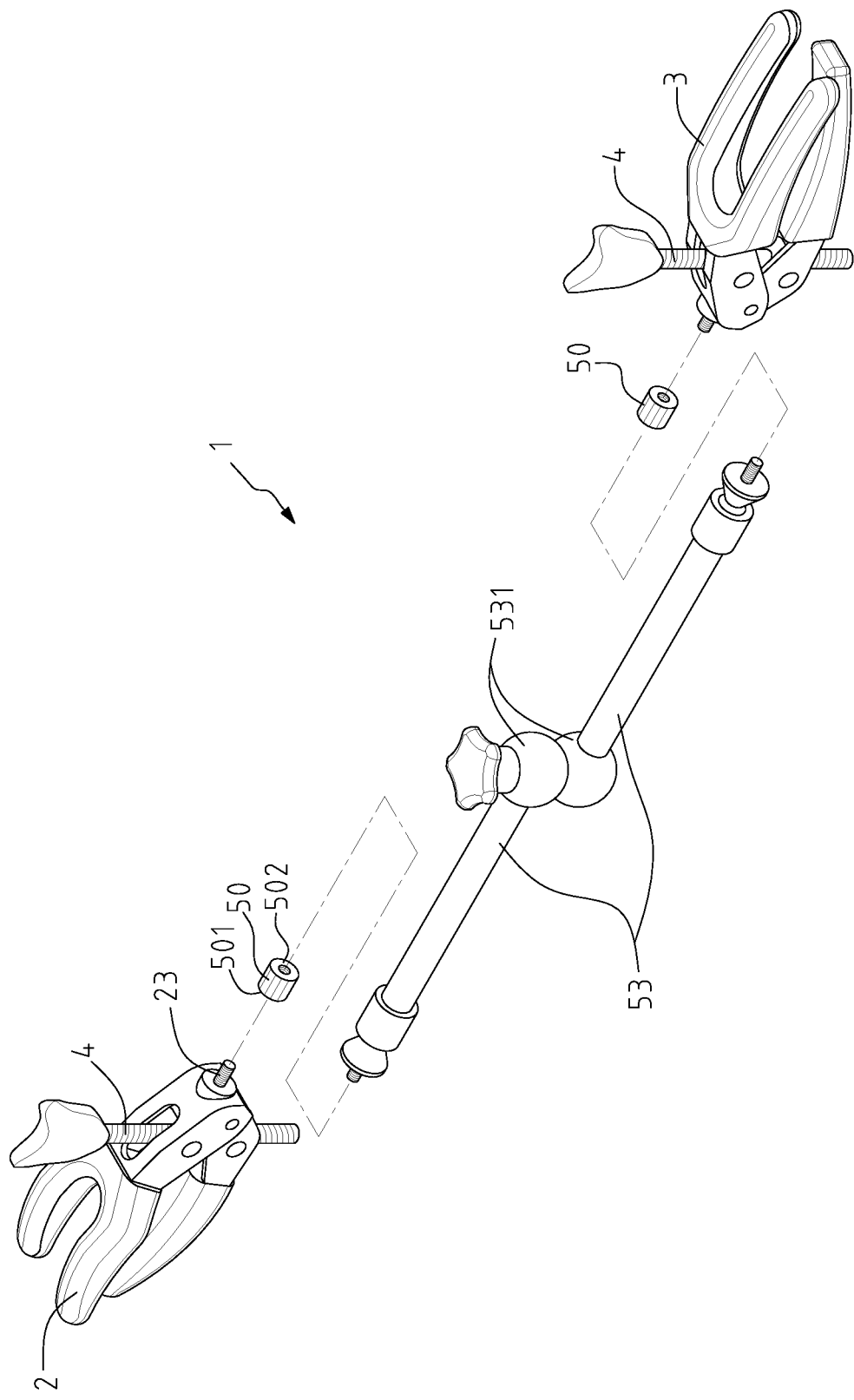
FIG. 8 is a perspective exploded view of FIG. 7.
Figure 9:
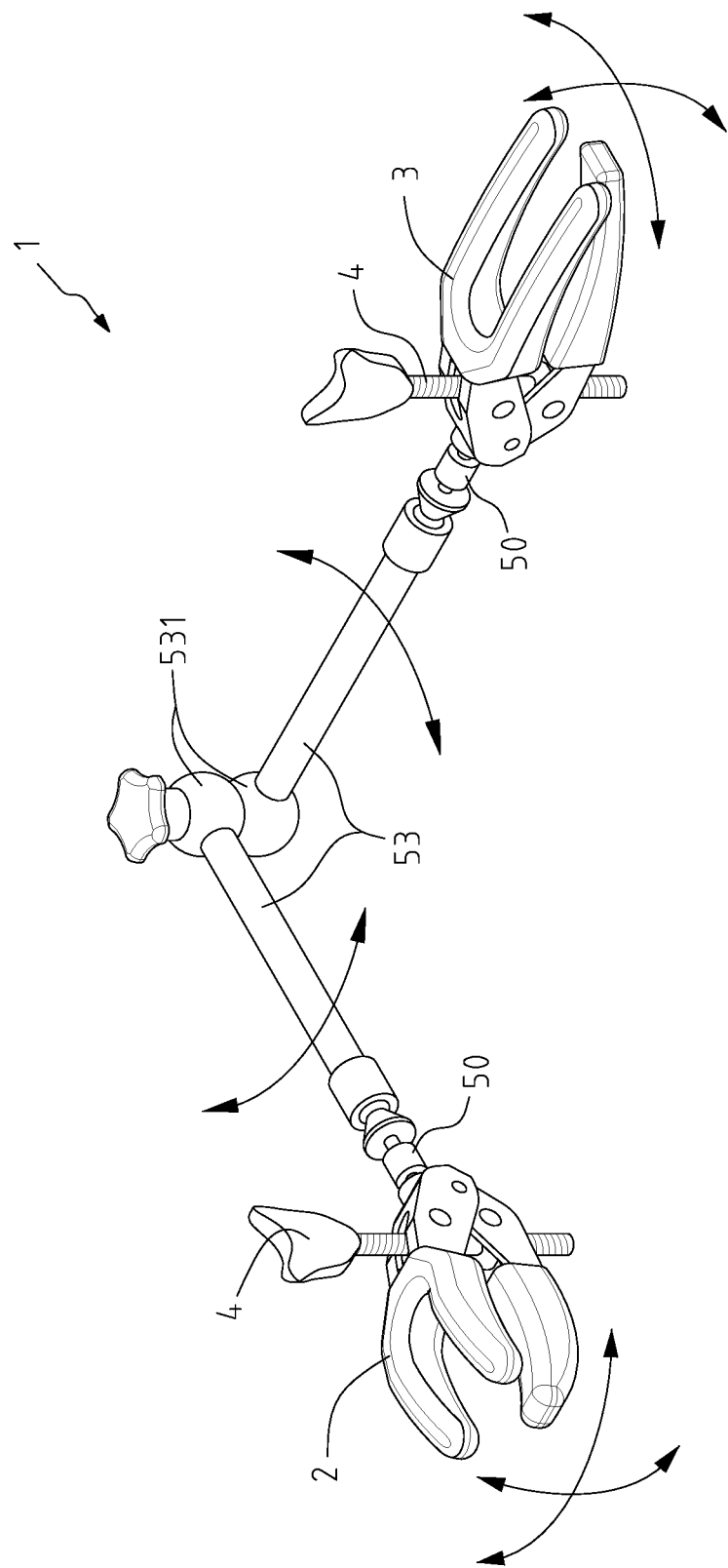
FIG. 9 is a schematic perspective view showing the hands-free dual clamp device of FIG. 7 in a state of use.

Referring to FIGS. 7 to 9 showing a second embodiment of the present invention, the clamping units 2 and 3 in the second embodiment have the same structural components as the embodiment shown in FIGS. 1-5. In this embodiment, the connecting module 5 comprises two connecting units 50 and an extending rod 53 having two ends to connect the two connecting units 50. More specifically, the extending rod 53 has at least two sections being coupled with a coupling element 531, so as to allow the extending rod 53 to be extendable in length, adjustable at angles, and is bendable.

Figure 11:
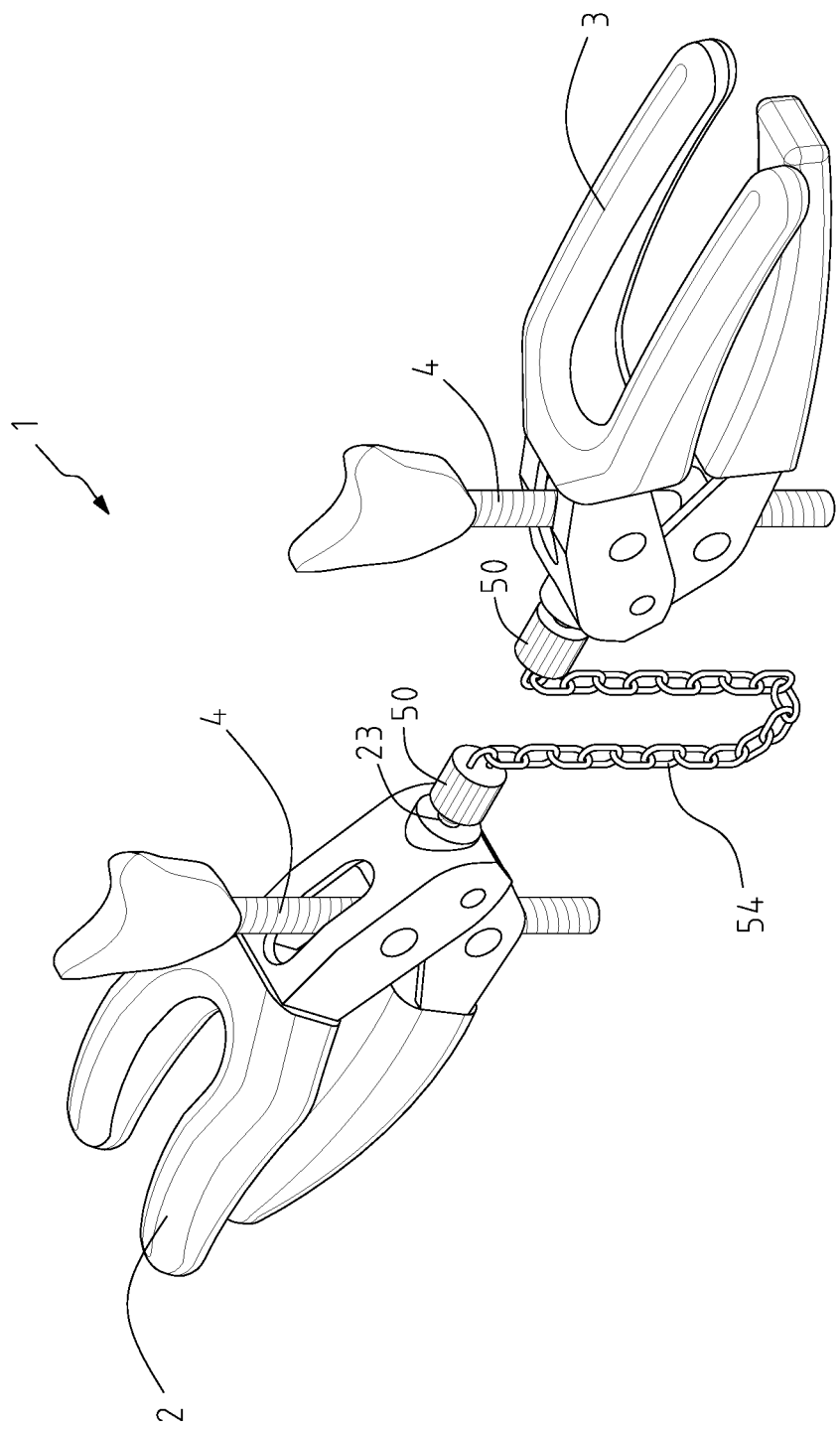
FIG. 11 is a perspective assembly view of a hands-free dual clamp device in accordance with a third embodiment of the present invention.

Referring to FIG. 11 showing a third embodiment of the present invention, the clamping units 2 and 3 in the third embodiment have the same structural components as the embodiment shown in FIGS. 1-5. In the third embodiment, the connecting module 5 comprises two connecting units 50 and a chain element 54 for linking the two connecting units 50. In this manner, the clamping units 2 and 3 are also extendable in length and adjustable at angles for convenient usage.

Figure 12:
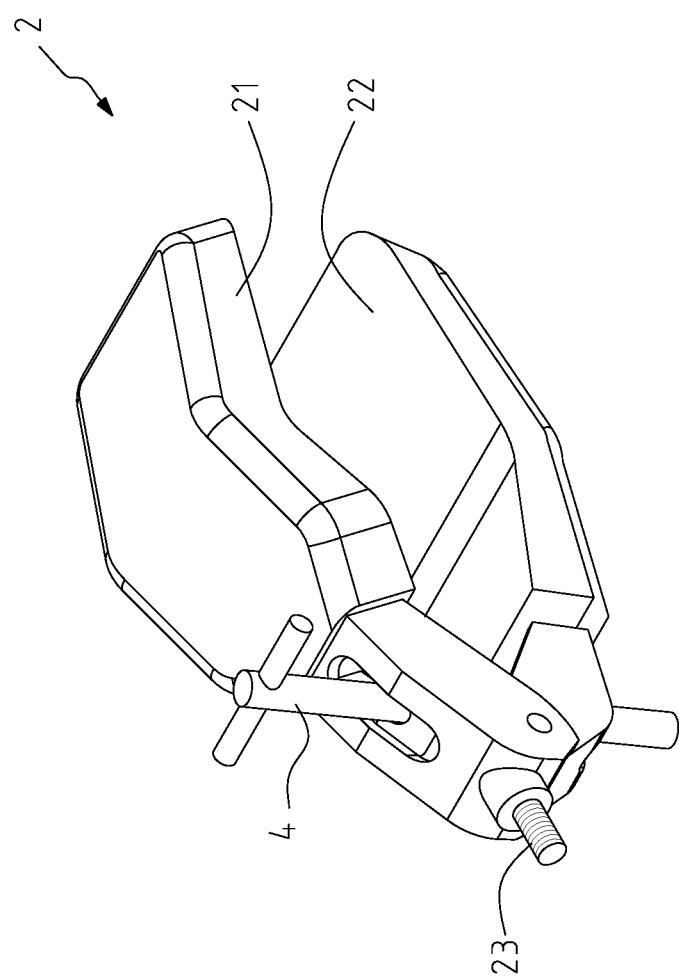
FIG. 12 is a schematic perspective view showing another embodiment of the clamping unit of the present invention.
Figure 14:
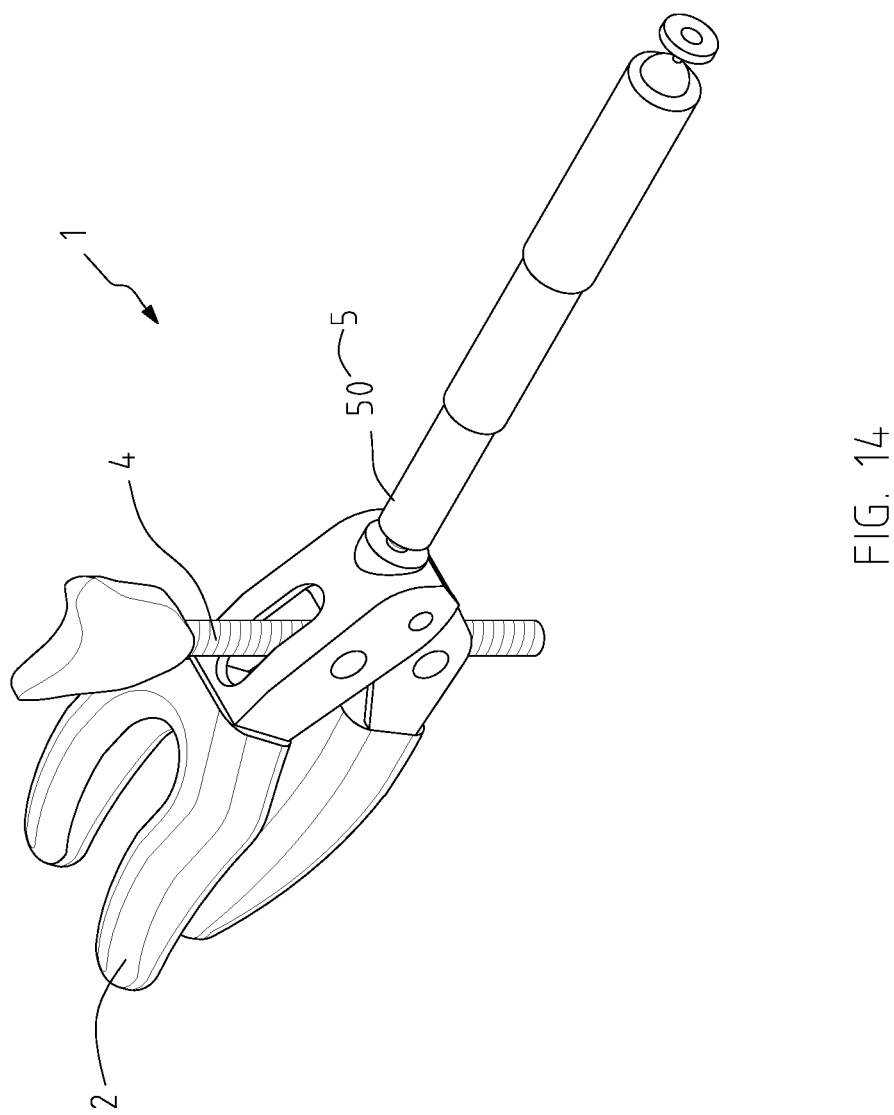
FIG. 14 is a schematic perspective view showing the hands-free dual clamp device in another state of use.

Referring to FIG. 12 showing another embodiment of the clamping unit 2, in this embodiment, the upper clamping body 21 and the lower clamping body 22 respectively have a single claw configuration which provides the same function as that of the two claw configuration as described in the previous embodiments. Referring to FIG. 14 showing another state of use of the present invention, as shown in FIG. 14, there is only the clamping unit 2 connected with the connecting unit 50 of the connecting module 5, while one end of the connecting module 5 is to be hand held, or is to be connected with the clamping unit 3 in alternative. The connecting unit 50 is capable of being telescopically extended or retracted.

Accordingly, the hands-free dual clamp device 1 of the present invention utilizes the connecting module 5 to detachably connect two clamping units 2 and 3 for clamping external objects 6 and 7 (e.g. smart phones, microphones, hangers or boards), where the clamping units 2 and 3 are capable of rotating at various angles so as to enable users to use mobile electronic devices to watch videos or to take a selfie without hand holding the device 1, whereby effectively overcoming the drawbacks of conventional fixing devices which are needed to be hand-held. Furthermore, the claw-type clamping unit 2 and 3 is capable of being adjusted by the shaft module 4 to readily adjust the size of the clamping space for fitting into various shapes of objects and applying secure clamping force thereon, whereby successfully overcoming the drawbacks of conventional fixing devices that utilize springs to provide clamping force which renders the clamping force insufficient, and are incapable of clamping round or irregular shapes of objects. In other words, the hands-free dual clamp device 1 is configured to fulfill the purpose of holding and fixing two objects without the aid of hands to hold the objects or the clamp device 1 such that an additional hand is created for use to effectively securely clamp objects and thus is very convenient to users.

It is understood that the invention may be embodied in other forms within the scope of the claims. Thus the present examples and embodiments are to be considered in all respects as illustrative, and not restrictive, of the invention defined by the claims.

What is claimed is:

1. A hands-free dual clamp device, comprising:
two clamping units, each of the clamping units comprising an upper clamping body, a lower clamping body, a mating portion disposed on one end of the upper clamping body, and a shaft module, one end of the lower clamping body pivotally connected to the one end of the upper clamping body, the shaft module spirally inserted through the upper and lower clamping bodies and being rotatable, so as to enable the upper and lower clamping bodies to be adjustable at angles with respect to each other and cooperatively form a clamping space for clamping an external object; and
a connecting module comprising at least a connecting unit having two opposite end portions, one of the end portions provided with a first connecting element, the other end portion provided with a second connecting element, the first connecting element connected to the mating portion of one of the clamping units, and the second connecting element connected to the mating portions of the other one of the clamping units, so that the two clamping units are linked together with the connecting module;
wherein the upper clamping body and the lower clamping body respectively define a root portion located adjacent to the mating portion, the shaft module comprises an outer shaft, an inner shaft, and two sleeve pieces respectively disposed in the root portions of the upper and lower clamping bodies, and the sleeve pieces of the upper and lower clamping bodies are rotatable in the root portions, so that the outer shaft and the inner shaft are capable of swinging with respect to the sleeve pieces when the outer shaft rotates, whereby quickly adjusting a size of the clamping space between the upper and lower clamping bodies.

2. The hands-free dual clamp device of claim 1, wherein the outer and inner shafts respectively form threads, the outer shaft is spirally connected with the sleeve piece of the upper clamping body, and a part of the inner shaft is spirally engaged into the outer shaft, and another part of the inner shaft is spirally connected with the sleeve piece of the lower clamping body.

3. The hands-free dual clamp device of claim 2, wherein the threads of the outer shaft spiral in a direction opposite to that of the inner shaft, and the inner shaft is coaxially rotatable in the sleeve piece of the lower clamping body in conjunction with rotation of the outer shaft.

4. The hands-free dual clamp device of claim 1, wherein at least one of the upper clamping bodies comprises two claws extending from the root portion and being spaced apart to form an interval, and the corresponding lower clamping body is capable of being adjusted by the shaft module to move into the interval.

5. The hands-free dual clamp device of claim 1, wherein each of the root portions of the upper clamping body and the lower clamping body has a track slot formed thereon and penetrating the root portion, and the track slots are respectively configured to provide a space for the outer shaft and the inner shaft to swing therein.

6. The hands-free dual clamp device of claim 1, wherein the connecting module comprises the two connecting units and an extending rod having two ends to connect the two connecting units, and the extending rod is extendable in length, adjustable at angles, and is bendable.

7. The hands-free dual clamp device of claim 1, wherein the connecting module comprises the two connecting units and a chain element for linking the two connecting units.

8. The hands-free dual clamp device of claim 1, wherein the first connecting element and the second connecting element respectively protrude inward to form a hole-shaped configuration, and the mating portions of the two clamping units protrude out of the upper clamping bodies to be connected to the first and second connecting elements.

9. The hands-free dual clamp device of claim 1, wherein the connecting module comprises the two connecting units and a universal joint which connects the two connecting units.

\* \* \* \* \*